March 18, 1924.
W. A. RINGLER
1,487,520
FRAME OR HOLDER FOR DISPLAY MATTER
Filed March 14, 1923
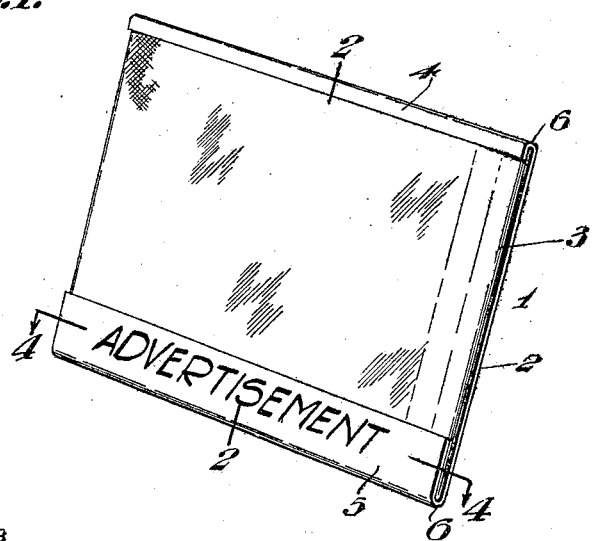
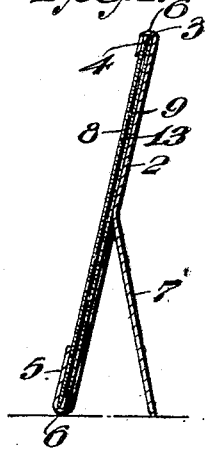
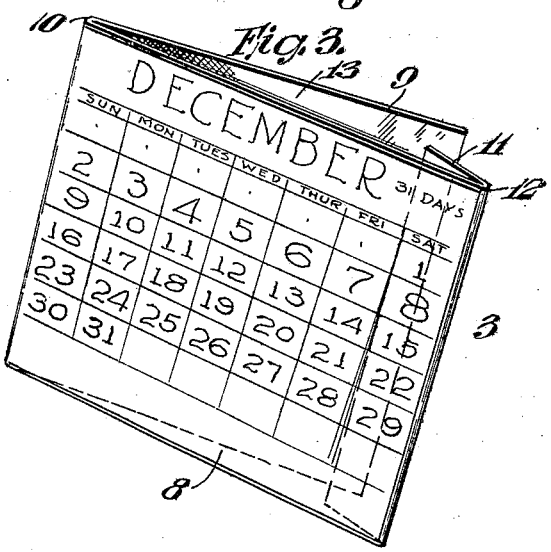
INVENTOR:
William A. Ringler.
BY
ATTORNEYS.

Patented Mar. 18, 1924.

1,487,520

UNITED STATES PATENT OFFICE.

WILLIAM A. RINGLER, OF PHILADELPHIA, PENNSYLVANIA.

FRAME OR HOLDER FOR DISPLAY MATTER.

Application filed March 14, 1923. Serial No. 624,885.

*To all whom it may concern:*

Be it known that I, WILLIAM A. RINGLER, a citizen of the United States, residing at Philadelphia, county of Philadelphia, State of Pennsylvania, have invented a new and useful Frame or Holder for Display Matter, of which the following is a specification.

The object of my present invention is to devise a novel construction and arrangement of a frame or holder for display matter wherein the holder is provided with a pocket to receive the matter to be displayed, the walls of the pocket being formed of transparent material so that the matter to be displayed will be readily visible and at the same time be protected from dirt, dust and foreign material which would otherwise collect upon it.

With the above and other objects which will hereinafter more clearly appear, my invention comprehends a novel construction and arrangement of a frame or holder for display matters.

It further comprehends a novel construction and arrangement of a pocket which is detachable from the frame and which co-operates with the frame in such a manner that a frictional lock is provided to yieldingly retain the pocket in assembled position with respect to the frame.

It further comprehends a novel construction of a pocket which is formed from integral sheets of transparent material having overlapping portions which co-operate with guides on the frame to form retaining means which prevent the pocket from being accidentally removed from the frame proper.

Other novel features of construction and advantage will hereinafter more fully appear in the detailed description and the appended claims.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents, in perspective, a frame or holder for display matter, embodying my invention.

Figure 2 represents a section on line 2—2 of Figure 1.

Figure 3 represents, in perspective and in detached position, a transparent pocket which is adapted to be slidably assembled with respect to the frame.

Figure 4 represents a section on line 4—4 of Figure 1.

Similar numerals of reference indicate corresponding parts.

Referring to the drawings.

1 designates a frame or holder for display matter, embodying my invention, consisting of a frame proper 2 and a transparent pocket 3. The frame proper is preferably made from an integral piece of sheet material having the inturned marginal flanges 4 and 5, respectively, which are diametrically opposite each other, as illustrated, and which may be of such width as to receive any desired advertising matter. These inturned flanges form with the body portion of the frame proper the slots 6 into which the pocket 3 is adapted to be slid, as will be hereinafter explained. The body portion of the frame proper may have a portion thereof rearwardly deflected, as at 7, in order to form an easel. The pocket 3 is formed from a sheet of transparent flexible material such as, for example, celluloid, so that a front transparent face 8 is provided, the sheet being bent upon itself to form the rear flap 9 by bending it to form a resilient hinged portion 10 at one end. At the opposite end an inturned flap 11 is formed which at its point of connection with the front face 8 forms a resilient hinge 12.

The matter to be displayed which is preferably but not necessarily in sheet form is placed within the chamber 10 and the end at which the flexible hinge 13 is located is inserted into the slot 6 and the pocket is slid into the position seen in Figure 1. It will be understood from Figure 4 that when the pocket is in this position the flap 11 which is connected by the resilient hinge 12 with the front face 8 of the pocket will have a resilient or spring action against the rear flap 9 which is also connected to the front face 8 by a resilient hinge 10, so that at the right hand portion of the pocket, as illustrated, there will be a frictional grip between the walls of the pocket and the juxtaposed walls of the flanges 5 in the body portion of the frame proper. The pocket is preferably formed from a sheet of transparent material of substantially uniform width so that the inturned flanges 5 will contribute with the pocket 3 to form a closed chamber 13 within which is contained the matter to be displayed. It will thus be seen that this matter is protected from coming into contact with dirt, dust and foreign material and the matter displayed will be visible through the transparent front face or wall 8 of the pocket 3.

Any desired character of display matter may be inserted in the chamber of the pocket before it is assembled with the frame pocket. The rear wall of the pocket preferably forms overlapping sections which preferably are in proximity to one end of the pocket in order that the pocket will slide freely when it is initially inserted in the frame and as it reaches its proper position, a frictional locking action is effected between the pocket and juxtaposed portions of the frame. The pocket is preferably formed from a single sheet of material which is transversely folded so that after the display matter has been inserted in the pocket chamber two opposite sides will be open and two opposite sides will be closed and as soon as the pocket is assembled with respect to the frame, the frame forms a closure for the two open sides.

It will now be apparent that I have devised a new and useful frame or holder for display matter which embodies the features of advantage enumerated as desirable in the statement of the invention and the above description, and while I have, in the present instance, shown and described an embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. In a device of the character stated the combination of an easel the front of which is provided with oppositely located guides, with a chambered pocket having its front wall transparent and its rear wall provided with overlapping portions, the ends of the pocket being closed and the top and the bottom of the pocket being open, said pocket being adapted to slidably engage said guides and have its open sides closed thereby.

2. In a device of the character stated the combination of an easel the front of which is provided with opposed guides with a pocket formed from transparent sheet material folded upon itself to have its free ends overlap and form a chamber with its top and bottom open and adapted to receive the matter to be displayed, said pocket being adapted to slidably engage said guides, which latter close the opposite open sides of said pocket chamber.

3. In a device of the character stated the combination of an easel the front of which is provided with opposed guides with a pocket formed from a sheet of flexible transparent material of greater length than width having its rear wall in section and flexibly connected to its front wall, and formed by bending the strip transversely of its length, said sections overlapping near one end of the pocket, whereby, when the pocket is assembled with said frame, the overlapping portions of said rear sections will effect a resilient frictional locking engagement of said pocket with said guides and the juxtaposed portions of said frame.

4. In a device of the character stated a plate having struck-out therefrom a support to provide an easel, the front of said plate having upper and lower, horizontally disposed, guide rails, and a transparent envelope for containing indicia bearing matter, which envelope is open top and bottom and is detachably open at one end, said envelope when inserted endwise between said guide rails has its open portions closed thereby, the envelope rear wall closing the opening made by said struck-out support, whereby the envelope contents is protected from foreign substances.

WILLIAM A. RINGLER.

Witnesses:
H. S. FAIRBANKS,
C. D. McVAY.